(12) United States Patent
Shoji et al.

(10) Patent No.: US 11,745,792 B2
(45) Date of Patent: Sep. 5, 2023

(54) STEERING DEVICE

(71) Applicant: JTEKT CORPORATION, Osaka (JP)

(72) Inventors: Naoki Shoji, Shiki-gun (JP); Tomohiro Nakade, Sakura (JP); Robert Fuchs, Nara (JP)

(73) Assignee: JTEKT CORPORATION, Kariya (JP)

( * ) Notice: Subject to any disclaimer, the term of this patent is extended or adjusted under 35 U.S.C. 154(b) by 94 days.

(21) Appl. No.: 17/371,822

(22) Filed: Jul. 9, 2021

(65) Prior Publication Data
US 2022/0017143 A1   Jan. 20, 2022

(30) Foreign Application Priority Data
Jul. 14, 2020 (JP) .............................. 2020-120594

(51) Int. Cl.
*B62D 6/00*     (2006.01)
*B62D 5/04*     (2006.01)
*B62D 6/08*     (2006.01)

(52) U.S. Cl.
CPC ........... *B62D 6/008* (2013.01); *B62D 5/0481* (2013.01); *B62D 6/08* (2013.01)

(58) Field of Classification Search
CPC .... B62D 5/0463; B62D 6/008; B62D 15/025; B62D 1/286; B62D 6/002; B62D 15/021; B62D 6/007; B62D 6/04; B62D 5/001; B62D 5/005; B60W 10/20; B60W 2420/00; B60W 2710/202
See application file for complete search history.

(56) References Cited

U.S. PATENT DOCUMENTS

2005/0017664 A1* 1/2005 Takahashi .............. B62D 5/006
                                                                   318/432
2020/0346686 A1   11/2020 Schafer

FOREIGN PATENT DOCUMENTS

| DE | 102017215593 A1 | 3/2019 |
| EP | 2172386 A1 | 4/2010 |
| EP | 2905204 A1 | 8/2015 |
| EP | 3517408 A1 | 7/2019 |
| JP | 2004-224238 A | 8/2004 |

OTHER PUBLICATIONS

Dec. 15, 2021 Extended European Search Report issued in Patent Application No. 21184716.5.

* cited by examiner

*Primary Examiner* — Adam R Mott
*Assistant Examiner* — Erick T. Detweiler
(74) *Attorney, Agent, or Firm* — Oliff PLC

(57) ABSTRACT

A steering device includes a steering member, a steering operation mechanism, a reactive force motor, a steering motor that drives the steering operation mechanism, a steering torque sensor, and an electronic control unit. The electronic control unit sets a manual steering angle command value. The electronic control unit computes a reactive-force-related composite angle command value. The electronic control unit computes a steering-related composite angle command value based on a steering-related automatic steering angle command value and the manual steering angle command value. The electronic control unit causes a rotational angle of the reactive force motor to follow the reactive-force-related composite angle command value. The electronic control unit causes a rotational angle of the steering motor to follow the steering-related composite angle command value. The electronic control unit estimates a first disturbance torque.

6 Claims, 8 Drawing Sheets

STEERING DEVICE

CROSS-REFERENCE TO RELATED APPLICATION

This application claims priority to Japanese Patent Application No. 2020-120594 filed on Jul. 14, 2020, incorporated herein by reference in its entirety.

BACKGROUND

1. Technical Field

The disclosure relates to a steering device in which a steering operation mechanism is driven by a steering motor, in a state in which a steering member operated for steering and the steering operation mechanism are not mechanically linked.

2. Description of Related Art

Japanese Unexamined Patent Application Publication No. 2004-224238 (JP 2004-224238 A) discloses a steer-by-wire system in which a steering operation mechanism is driven by a steering motor, in a state in which a steering member operated for steering and the steering operation mechanism are not mechanically linked. The steer-by-wire system described in JP 2004-224238 A is provided with an operating unit that has an operating reactive force motor, a steering unit that has a steering motor, an operation reactive force control unit that controls the operating unit, a turning control unit that controls the steering unit, and an automatic following system. The turning control unit controls the steering motor based on a final target steered angle.

In the automatic following system in JP 2004-224238 A, the final target steered angle is set as follows. When the automatic following system is not operating, a target steered angle computed based on an operating angle of an operating wheel is set as the final target steered angle. When the automatic following system is operating and steering torque is no lower than a first threshold value, or when the automatic following system is operating and the operating angle is no lower than a second threshold value, a value obtained by multiplying the target steered angle computed based on the operating angle of the operating wheel by a predetermined value that is larger than 1 is set as the final target steered angle. When the automatic following system is operating and the steering torque is lower than the first threshold value and also the operating angle is lower than the second threshold value, a target steered angle set by the automatic following system is set as the final target steered angle.

SUMMARY

In the steer-by-wire system described in the aforementioned JP 2004-224238 A, during automatic steering control in which the automatic following system is operating, intent of a driver is not reflected in the target steered angle until the steering torque reaches the first threshold value or higher, or the operating angle reaches the second threshold value or higher. It is an object of the disclosure to provide a steering device capable of promptly reflecting intent of the driver with regard to the steering motor and the reactive force motor during automatic steering control.

An aspect of the disclosure is a steering device. The steering device includes a steering member, a steering operation mechanism mechanically separated from the steering member, a reactive force motor configured to impart reactive force torque to the steering member, a steering motor configured to drive the steering operation mechanism; a steering torque sensor configured to detect steering torque imparted to the steering member; and an electronic control unit. The electronic control unit is configured to set a manual steering angle command value based on the steering torque. The electronic control unit is configured to compute a reactive-force-related composite angle command value based on a reactive-force-related automatic steering angle command value and the manual steering angle command value. The electronic control unit is configured to compute a steering-related composite angle command value based on a steering-related automatic steering angle command value and the manual steering angle command value. The electronic control unit is configured to cause a rotational angle of the reactive force motor to follow the reactive-force-related composite angle command value. The electronic control unit is configured to cause a rotational angle of the steering motor to follow the steering-related composite angle command value. The electronic control unit is configured to estimate first disturbance torque. The first disturbance torque is disturbance torque other than motor torque of the steering motor acting on an object of driving by the steering motor.

According to the above configuration, intent of the driver can be promptly reflected with regard to the steering motor and the reactive force motor during automatic steering control.

In the steering device, the electronic control unit may be configured to compute a first basic command value based on the steering-related composite angle command value, and may be configured to compensate the first basic command value by the first disturbance torque. According to the above configuration, the first basic command value is compensated by the first disturbance torque, and accordingly the effects of disturbance on the angle control capabilities of the electronic control unit can be suppressed. Thus, highly precise angle control of the steering motor can be realized.

In the steering device, the electronic control unit may be configured to compute a second basic command value based on the reactive-force-related composite angle command value. The electronic control unit may be configured to estimate second disturbance torque. The second disturbance torque may be a disturbance torque other than motor torque of the reactive force motor acting on an object of driving by the reactive force motor. The electronic control unit may be configured to compensate the second basic command value by the second disturbance torque.

In the steering device, the electronic control unit may be configured to use estimated torque calculated based on the first disturbance torque to generate the manual steering angle command value.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

An embodiment of the disclosure will be described below in detail with reference to the attached drawings.

1. Schematic Configuration of Steering Device 1

Figure 1:
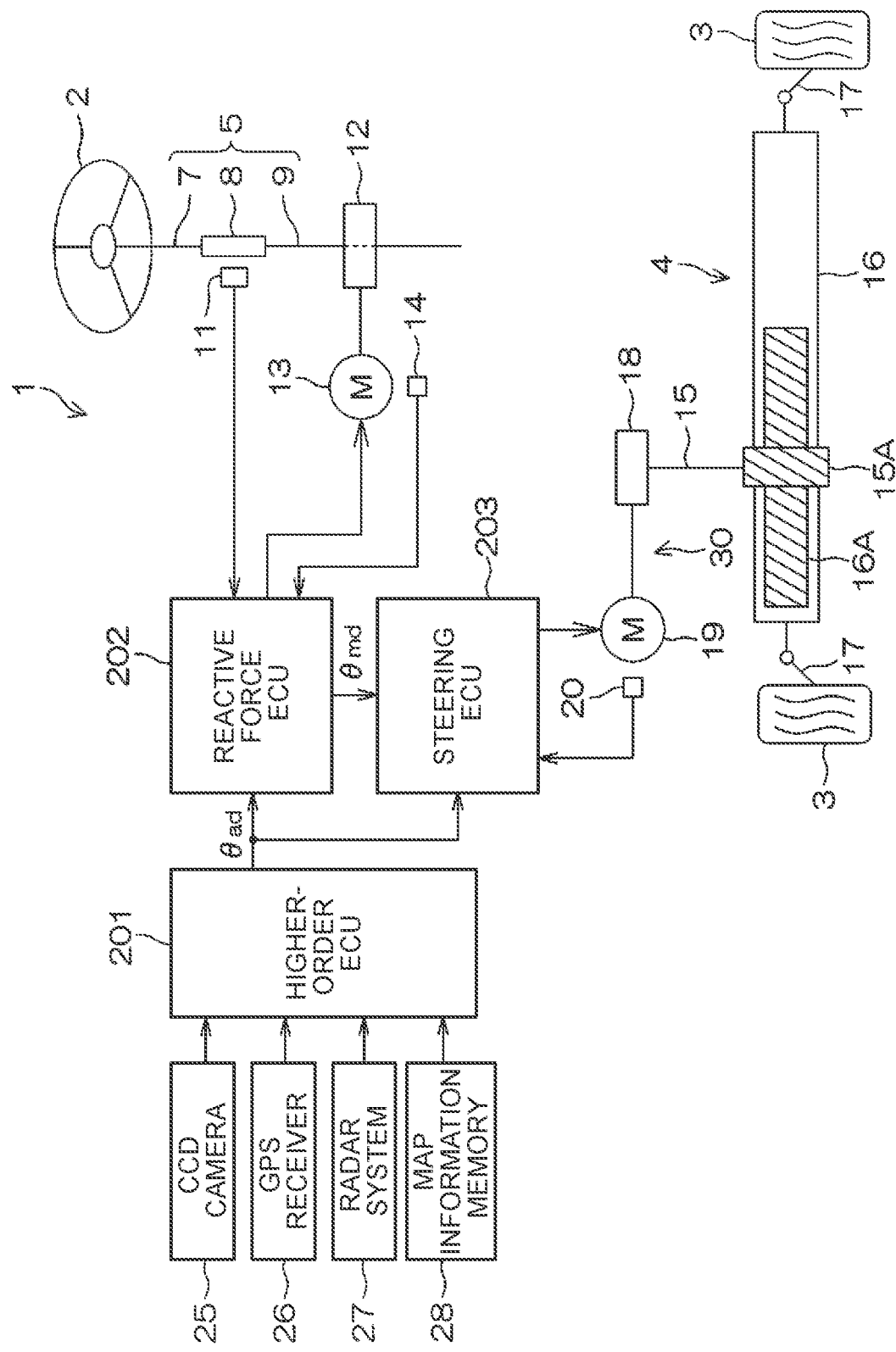
FIG. 1 is a schematic diagram illustrating a schematic configuration of a steering device according to an embodiment of the disclosure.

A steering device 1 includes a steering wheel 2 serving as a steering member by which a vehicle is steered, a steering operation mechanism 4 for steering steered wheels 3, and a steering shaft 5 linked to the steering wheel 2, as illustrated in FIG. 1. Note, however, that there is no mechanical linkage between the steering shaft 5 and the steering operation mechanism 4 whereby torque, motion such as rotations, and so forth, would be transmitted.

The steering shaft 5 includes a first shaft 7 of which one end is linked to the steering wheel 2, a torsion bar 8 of which one end is linked to the other end of the first shaft 7, and a second shaft 9 of which one end is linked to the other end of the torsion bar 8. A torque sensor 11 is disposed in the proximity of the torsion bar 8. The torque sensor 11 detects steering torque $T_d$ applied to the steering wheel 2 based on relative rotational displacement amount of the first shaft 7 and the second shaft 9. In this embodiment, the steering torque $T_d$ detected by the torque sensor 11 is detected as follows, for example. That is to say, torque for steering toward the left direction is detected as a positive value, and torque for steering toward the right direction is detected as a negative value. The greater the absolute value thereof is, the greater the magnitude of the steering torque $T_d$ is.

A reactive force motor 13 for controlling the rotational angle of the second shaft 9 (hereinafter may be referred to as "steering wheel angle") is linked to the second shaft 9 via reduction gear 12. The reactive force motor 13 is an electric motor to impart reactive torque to the second shaft 9. The reduction gear 12 is made up of a worm gear mechanism that includes a worm gear (omitted from illustration) that is linked to an output shaft of the reactive force motor 13 so as to be integrally rotatable therewith, and a worm wheel (omitted from illustration) that is meshed with this worm gear and that is linked to the second shaft 9 so as to be integrally rotatable therewith. A rotational angle sensor 14 that detects the rotational angle of the reactive force motor 13 is provided to the reactive force motor 13.

The steering operation mechanism 4 is made up of a rack-and-pinion mechanism that includes a pinion shaft 15 and a rack shaft 16. The steered wheel 3 is linked to each end portion of the rack shaft 16 via a tie rod 17 and a knuckle arm (omitted from illustration). The pinion shaft 15 is linked to an output shaft of a steering motor 19 via reduction gear 18. The reduction gear 18 is made up of a worm gear mechanism that includes a worm gear (omitted from illustration) that is linked to an output shaft of the steering motor 19 so as to be integrally rotatable therewith, and a worm wheel (omitted from illustration) that is meshed with this worm gear and that is linked to the pinion shaft 15 so as to be integrally rotatable therewith. A pinion 15A is linked to a distal end of the pinion shaft 15. A rotational angle sensor 20 that detects the rotational angle of the steering motor 19 is provided to the steering motor 19.

In the following, the reduction gear ratio (gear ratio) of the reduction gear 12 is represented by $N_r$, and the reduction gear ratio of the reduction gear 18 is represented by $N_s$. The reduction gear ratio is defined as the ratio of the rotation speed of the worm gear as to the rotation speed of the worm wheel. The rack shaft 16 extends linearly following the right-left direction of the vehicle. A rack 16A that meshes with the pinion 15A is formed on the rack shaft 16. When the steering motor 19 rotates, the rotational force thereof is transmitted to the pinion shaft 15 via the reduction gear 18. The rotation of the pinion shaft 15 is then converted into axial-direction movement of the rack shaft 16 by the rack-and-pinion mechanism. Thus, the steered wheels 3 are steered.

A charge-coupled device (CCD) camera 25 that takes images of the road ahead of the vehicle in the direction of travel, a Global Positioning System (GPS) receiver 26 for detecting own-vehicle position, a radar system 27 for detecting road features and obstructions, and map information memory 28 storing map information, are installed in the vehicle. The CCD camera 25, the GPS receiver 26, the radar system 27, and the map information memory 28 are connected to a higher-order electronic control unit (ECU) 201 performing driving assistance control and automatic driving control. The higher-order ECU 201 performs surrounding-environment recognition, vehicle position estimation, route planning, and so forth, based on information obtained from the CCD camera 25, the GPS receiver 26, and the radar system 27, and the map information obtained from the map information memory 28, and decides control target values for steering and drive actuators.

In this embodiment, the higher-order ECU 201 sets a steering-related automatic steering angle command value for automatic steering as an automatic steering angle command value $\theta_{ad}$. In this embodiment, automatic steering control is control for causing the vehicle to travel along a target path, for example. The automatic steering angle command value $\theta_{ad}$ is a target value for the steering angle, to cause the vehicle to automatically travel along the target path. Processing of setting such an automatic steering angle command value $\theta_{ad}$ is known, and accordingly detailed description thereof will be omitted here. The automatic steering angle command value $\theta_{ad}$ is an example of a "steering-related automatic steering angle command value" of the disclosure, and also is an example of a "reactive-force-related automatic steering angle command value".

In this embodiment, the automatic steering angle command value $\theta_{ad}$, and a later-described assist torque command value $T_{ac}$ and a later-described manual steering angle command value $\theta_{md}$, are set to positive values when rotating the second shaft 9 in the left-steering direction by the reactive force motor 13, or steering the steered wheels 3 in the left-steering direction by the steering motor 19. On the other hand, these command values $\theta_{ad}$, $T_{ac}$, and $\theta_{md}$ are set to negative values when rotating the second shaft 9 in the right-steering direction by the reactive force motor 13, or steering the steered wheels 3 in the right-steering direction by the steering motor 19. Note that in this embodiment, the automatic steering angle command value $\theta_{ad}$ is set as the rotational angle of the pinion shaft 15, and the manual steering angle command value $\theta_{md}$ is set as the rotational angle of the second shaft 9.

The automatic steering angle command value $\theta_{ad}$ set by the higher-order ECU 201 is given to a reactive force ECU 202 and to a steering ECU 203 via an in-vehicle network. The reactive force ECU 202 is an ECU for controlling the reactive force motor 13, and the steering ECU 203 is an ECU for controlling the steering motor 19. The steering torque $T_d$ detected by the torque sensor 11 and the output signals of the rotational angle sensor 14 are input to the reactive force ECU 202. The reactive force ECU 202 controls the reactive force motor 13 based on these input signals and information given from the higher-order ECU 201.

Output signals of the rotational angle sensor 20 are input to the steering ECU 203. The steering ECU 203 controls the steering motor 19 based on the output signals of the rotational angle sensor 20, information given from the reactive force ECU 202, and information given from the higher-order ECU 201.

2. Electrical Configuration of Reactive Force ECU 202 and Steering ECU 203

2.1. Reactive Force ECU 202

Figure 2:
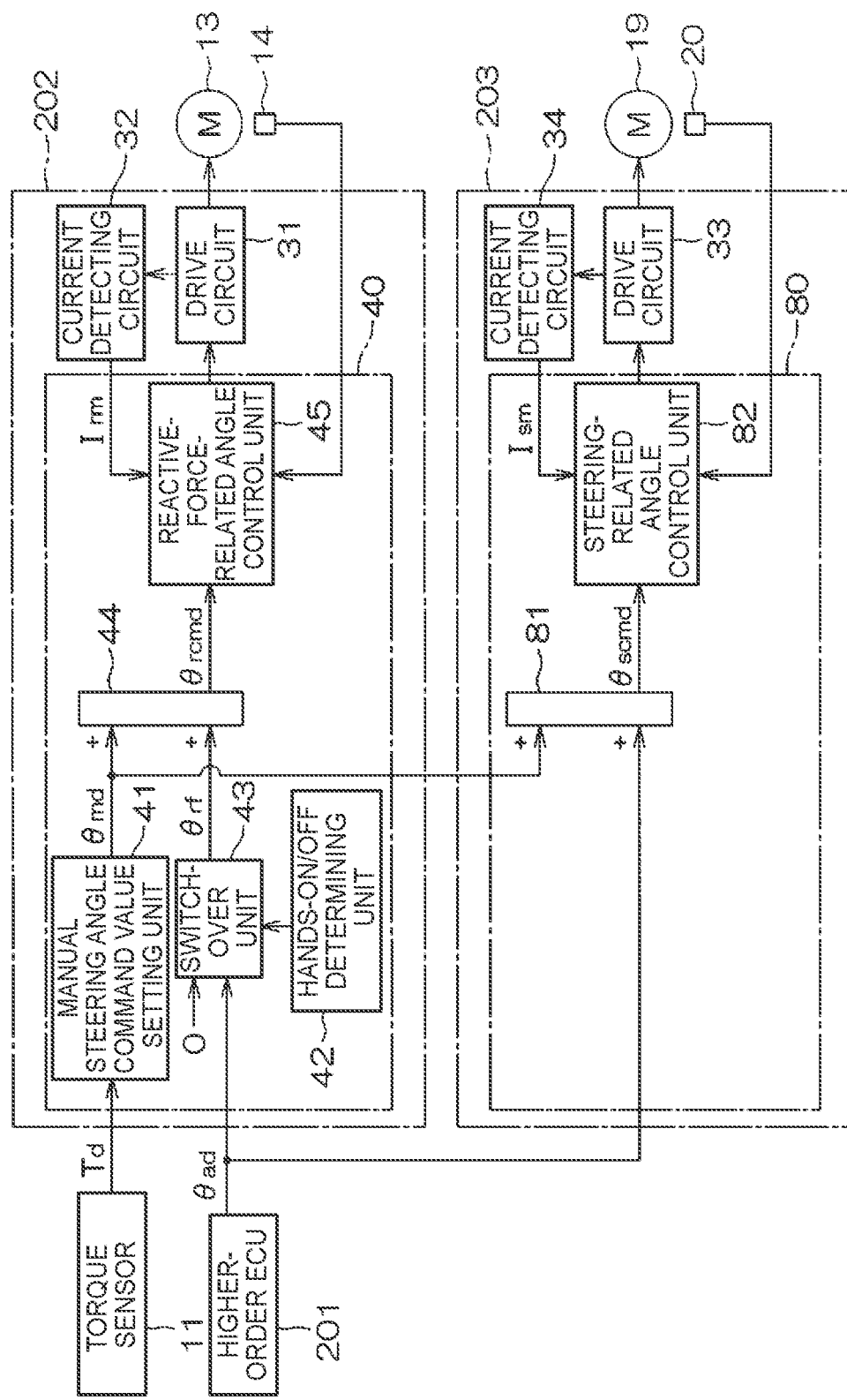
FIG. 2 is a block diagram for describing an electrical configuration of a reactive force electronic control unit (ECU) and a steering ECU.

The reactive force ECU 202 is provided with a microcomputer 40, a drive circuit (inverter circuit) 31 that is controlled by the microcomputer 40 and that supplies electric power to the reactive force motor 13, and a current detecting circuit 32 for detecting an electrical current flowing to the reactive force motor 13 (hereinafter referred to as "motor current $I_{rm}$"), as illustrated in FIG. 2.

The microcomputer 40 is provided with a central processing unit (CPU) and memory (read-only memory (ROM), random access memory (RAM), or the like), and is arranged to function as a plurality of function processing units by executing a predetermined program. The function processing units include a manual steering angle command value setting unit 41, a hands-on/off determining unit 42, a switchover unit 43, a reactive-force-related composite angle command value computing unit 44, and a reactive-force-related angle control unit 45.

The manual steering angle command value setting unit 41 is provided so that when the driver operates the steering wheel 2, a steering angle corresponding to this steering wheel operation (more accurately, the rotational angle of the second shaft 9) is set as the manual steering angle command value $\theta_{md}$. The manual steering angle command value setting unit 41 sets the manual steering angle command value $\theta_{md}$ by using the steering torque $T_d$ detected by the torque sensor 11. Details of the manual steering angle command value setting unit 41 will be described later. The manual steering angle command value $\theta_{md}$ set by the manual steering angle command value setting unit 41 is given to the reactive-force-related composite angle command value computing unit 44.

The hands-on/off determining unit 42 determines whether the driver is gripping the steering wheel 2 (hands-on) or not gripping the steering wheel 2 (hands-off). Examples of arrangements that can be used as the hands-on/off determining unit 42 include an arrangement that determines hands-on/off based on output signals of a touch sensor provided to the steering wheel 2, an arrangement that determines hands-on/off based on images taken by a camera provided in the cabin, and so forth. Note that arrangements other than the above-described configurations may be used for the hands-on/off determining unit 42, as long as hands-on/off can be determined. A hands-on/off determination signal output from the hands-on/off determining unit 42 is given to the switchover unit 43.

When determination is made by the hands-on/off determining unit 42 that the driver is gripping the steering wheel 2, the switchover unit 43 gives the automatic steering angle command value $\theta_{ad}$ set by the higher-order ECU 201 to the reactive-force-related composite angle command value computing unit 44 as a reactive-force-related automatic steering angle command value $\theta_{rf}$. On the other hand, when determination is made by the hands-on/off determining unit 42 that the driver is not gripping the steering wheel 2, the switchover unit 43 gives zero to the reactive-force-related composite angle command value computing unit 44 as the reactive-force-related automatic steering angle command value $\theta_{rf}$.

The reactive-force-related composite angle command value computing unit 44 adds the manual steering angle command value $\theta_{md}$ set by the manual steering angle command value setting unit 41 to the reactive-force-related automatic steering angle command value $\theta_{rf}$ given by the switchover unit 43, and computes a reactive-force-related composite angle command value $\theta_{rcmd}$. The reactive-force-related angle control unit 45 performs angle control of the reactive force motor 13 based on the reactive-force-related composite angle command value $\theta_{rcmd}$. In this embodiment, the reactive-force-related angle control unit 45 performs drive control of the drive circuit 31 so that an estimation value $\hat{\theta}_{rt}$ (see FIG. 6) of a steering angle $\theta_{rt}$ (rotational angle of the second shaft 9) approximates the reactive-force-related composite angle command value $\theta_{rcmd}$. The reactive-force-related angle control unit 45 may perform drive control of the drive circuit 31 so that the steering angle $\theta_{rt}$ approximates the reactive-force-related composite angle command value $\theta_{rcmd}$. Details of the reactive-force-related angle control unit 45 will be described later.

2.2. Steering ECU 203

The steering ECU 203 is provided with a microcomputer 80, a drive circuit (inverter circuit) 33 that is controlled by the microcomputer 80 and that supplies electric power to the steering motor 19, and a current detecting circuit 34 for detecting an electrical current flowing to the steering motor 19 (hereinafter referred to as "motor current $I_{sm}$").

The microcomputer 80 is provided with a CPU and memory (ROM, RAM, or the like), and is arranged to function as a plurality of function processing units by executing a predetermined program. The function processing units include a steering-related composite angle command value computing unit 81 and a steering-related angle control unit 82.

The steering-related composite angle command value computing unit 81 adds the manual steering angle command value $\theta_{md}$ set by the manual steering angle command value setting unit 41 within the reactive force ECU 202 to the automatic steering angle command value (steering-related steering angle command value) $\theta_{ad}$ set by the higher-order ECU 201, and computes a steering-related composite angle command value $\theta_{scmd}$. The steering-related angle control unit 82 performs angle control of the steering motor 19 based on the steering-related composite angle command value $\theta_{scmd}$. In this embodiment, the steering-related angle control unit 82 performs drive control of the drive circuit 33 so that an estimation value $\hat{\theta}_{sp}$ of a steered angle $\theta_{sp}$ (rotational angle of the pinion shaft 15) (see FIG. 9) approximates the steering-related composite angle command value $\theta_{scmd}$. The steering-related angle control unit 82 may perform drive control of the drive circuit 33 so that the steered angle $\theta_{sp}$ approximates the steering-related composite angle command value $\theta_{scmd}$. Details of the steering-related angle control unit 82 will be described later.

3. Configuration of Manual Steering Angle Command Value Setting Unit 41

Figure 3:
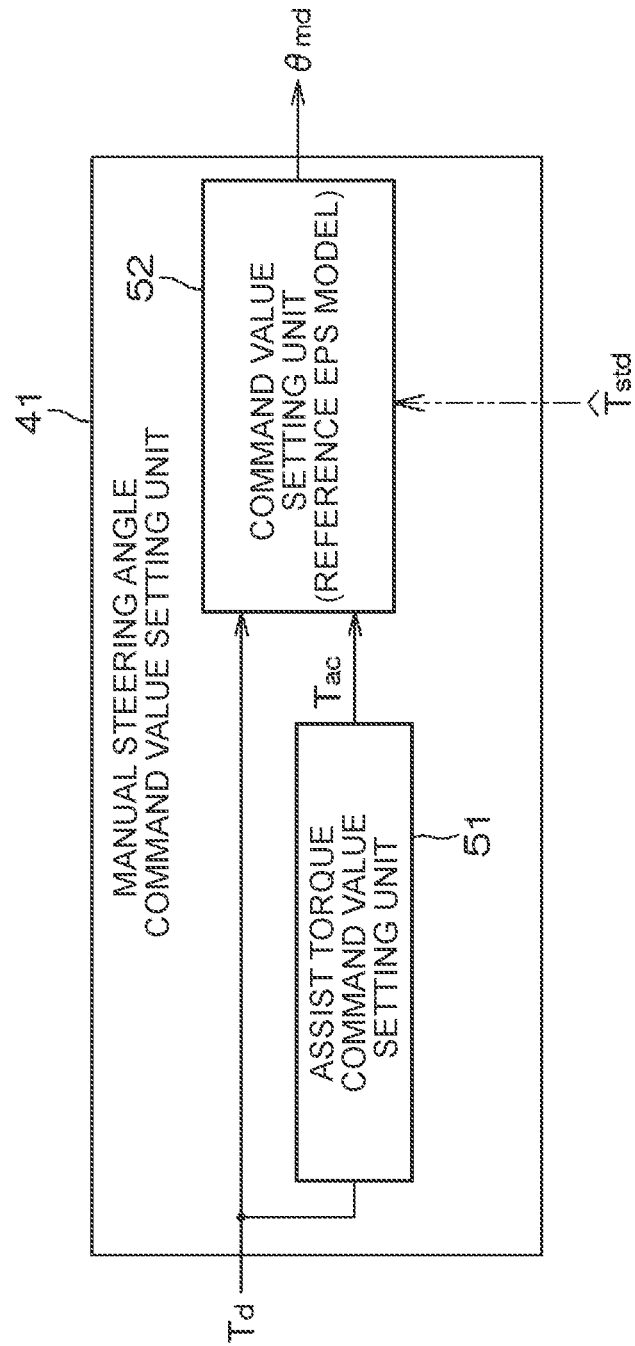
FIG. 3 is a block diagram illustrating a configuration of a manual steering angle command value setting unit.

The manual steering angle command value setting unit 41 includes an assist torque command value setting unit 51 and a command value setting unit 52, as illustrated in FIG. 3.

Figure 4:
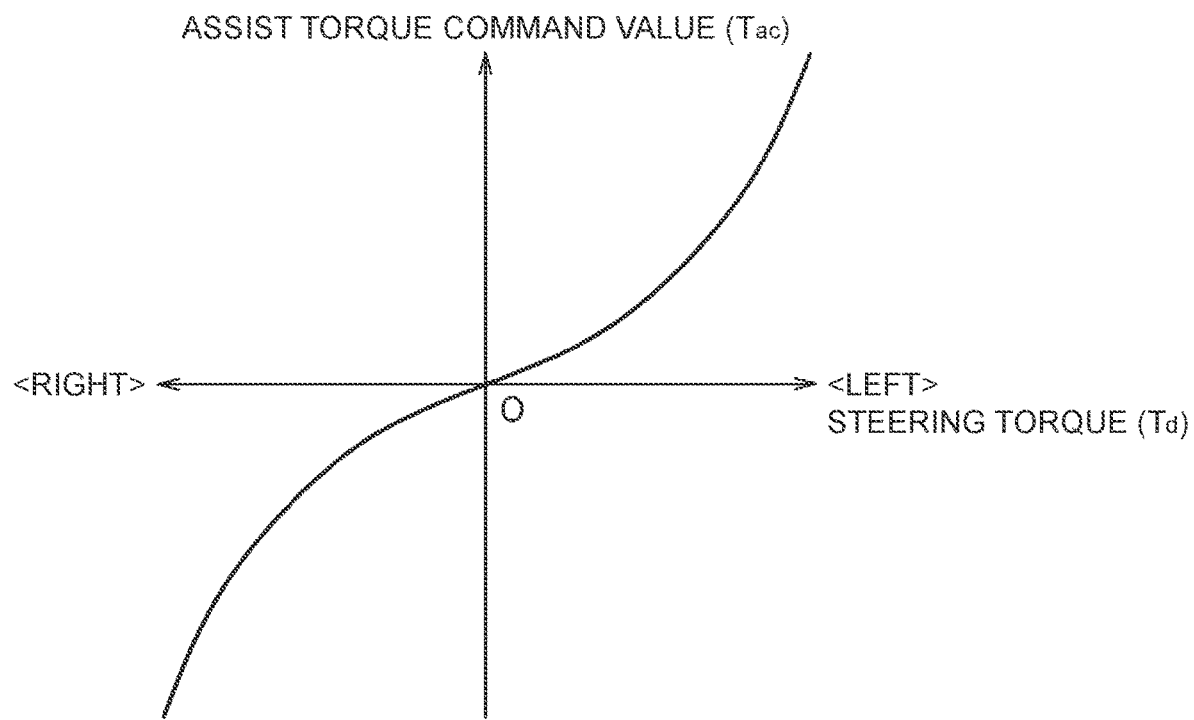
FIG. 4 is a graph for describing an example of setting an assist torque command value $T_{ac}$ as to steering torque $T_d$.

The assist torque command value setting unit 51 sets the assist torque command value $T_{ac}$ that is a target value for assist torque necessary for manual operations. The assist torque command value setting unit 51 sets the assist torque command value $T_{ac}$ based on the steering torque $T_d$ detected by the torque sensor 11. FIG. 4 shows a setting example of the assist torque command value $T_{ac}$ as to the steering torque $T_d$.

The assist torque command value $T_{ac}$ assumes a positive value as to a positive value for the steering torque $T_d$, and assumes a negative value as to a negative value for the steering torque $T_d$. The assist torque command value $T_{ac}$ is set so as to have a larger absolute value the greater the absolute value of the steering torque $T_d$ is. Note that the assist torque command value setting unit 51 may compute the assist torque command value $T_{ac}$ by multiplying the steering torque $T_d$ by a constant that is set in advance.

Figure 5:
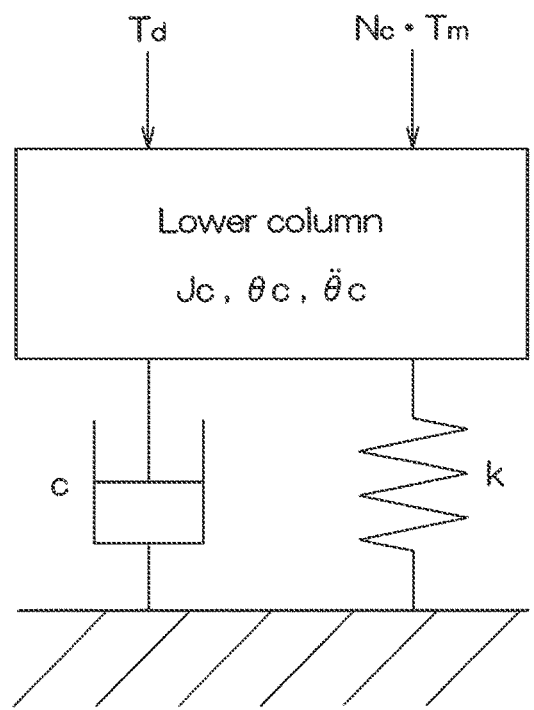
FIG. 5 is a schematic diagram illustrating an example of a reference electric power steering (EPS) model used by a command value setting unit.

In this embodiment, the command value setting unit 52 sets a manual steering command value $\theta_{mdac}$ using a reference electric power steering (EPS) model. FIG. 5 is a schematic diagram illustrating an example of the reference EPS model used by the command value setting unit 52. This reference EPS model is a single inertia model that includes a lower column. In FIG. 5, $J_c$ represent inertia of the lower column, $\theta_c$ represents the rotational angle of the lower column, and $T_d$ represent the steering torque. The steering torque $T_d$, torque $N_c \cdot T_m$ from the electric motor (assist motor), and road surface load torque $T_{rl}$ are applied to the lower column. $N_c$ is the reduction gear ratio of the reduction gear provided on a transmission path between the assist motor and the lower column, and $T_m$ is motor torque generated by the assist motor. The road surface load torque $T_{rl}$ is expressed by the following Expression (1), using a spring constant k and a viscous damping coefficient c.

$$T_{rl} = -k\theta_c - c\dot{\theta}_c \quad (1)$$

In this embodiment, predetermined values found in advance through experimentation, analysis, and so forth, are set as the spring constant k and the viscous damping coefficient c. Accordingly, the Tri computed by Expression (1) is a virtual road surface load torque. The equation of motion of the reference EPS model is expressed by the following Expression (2).

$$J_c \ddot{\theta}_c = T_d \cdot N_c \cdot T_m - k\theta_c - c\dot{\theta}_c \quad (2)$$

The command value setting unit 52 computes the rotational angle $\theta_c$ of the lower column by substituting the steering torque $T_d$ detected by the torque sensor 11 into $T_d$, and substituting the assist torque command value $T_{ac}$ set by the assist torque command value setting unit 51 into $N_c \cdot T_m$, and solving the differential equation of Expression (2). The command value setting unit 52 then sets the obtained rotational angle $\theta_c$ of the lower column as the manual steering angle command value $\theta_{md}$.

4. Configuration of Reactive-Force-Related Angle Control Unit 45

Figure 6:
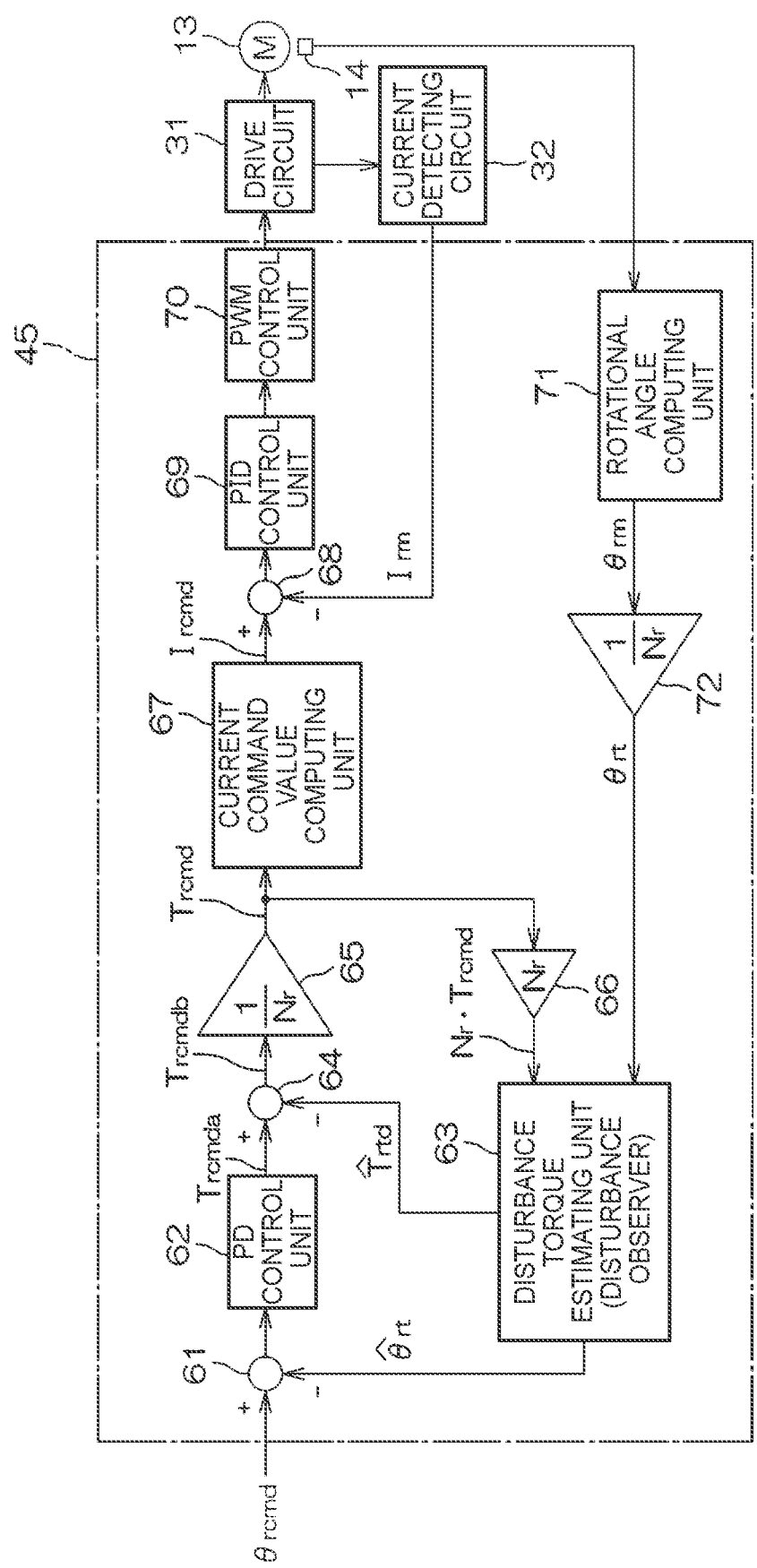
FIG. 6 is a block diagram illustrating a configuration of a reactive-force-related angle control unit.

The reactive-force-related angle control unit 45 controls the drive circuit 31 of the reactive force motor 13 based on the reactive-force-related composite angle command value $\theta_{rcmd}$, the motor current $I_{rm}$ detected by the current detecting circuit 32, and output signals of the rotational angle sensor 14, as illustrated in FIG. 6. The reactive-force-related angle control unit 45 includes an angle deviation computing unit 61, a proportional-derivative (PD) control unit 62, a disturbance torque estimating unit 63, a disturbance torque compensating unit 64, a first reduction gear ratio dividing unit 65, a reduction gear ratio multiplying unit 66, a current command value computing unit 67, a current deviation computing unit 68, a proportional-integral-derivative (PID) control unit 69, a pulse-width modulation (PWM) control unit 70, a rotational angle computing unit 71, and a second reduction gear ratio dividing unit 72.

The rotational angle computing unit 71 computes a rotor rotational angle $\theta_{rm}$ of the reactive force motor 13 based on output signals of the rotational angle sensor 14. The second reduction gear ratio dividing unit 72 converts the rotor rotational angle $\theta_{rm}$ into the rotational angle (actual steering angle) $\theta_{rt}$ of the second shaft 9, by dividing the rotor rotational angle $\theta_{rm}$, computed by the rotational angle computing unit 71, by the reduction gear ratio $N_r$ of the reduction gear 12. The disturbance torque estimating unit 63 is provided to estimate nonlinear torque generated as disturbance (disturbance torque, i.e., torque other than reactive force motor torque) at a control object of the reactive force motor 13 (hereinafter referred to as "first plant"). The disturbance torque estimating unit 63 estimates disturbance torque (disturbance load) $T_{rtd}$, steering angle $\theta_{rt}$, and steering angle derivative value (angular velocity) $d\theta_{rt}/dt$, based on a torque command value $N_r \cdot T_{rcmd}$ that is an input value of the first plant, and the actual steering angle $\theta_{rt}$ that is output of the first plant. Estimation values of the disturbance torque $T_{rtd}$, steering angle $\theta_{rt}$, and steering angle derivative value $d\theta_{rt}/dt$, will respectively be written as $\hat{T}_{rtd}$, $\hat{\theta}_{rt}$, and $d\hat{\theta}_{rt}/dt$. Details of the disturbance torque estimating unit 63 will be described later.

The disturbance torque estimation value $\hat{T}_{rt}a$ computed by the disturbance torque estimating unit 63 is given to the disturbance torque compensating unit 64 as a disturbance torque compensation value. The steering angle estimation value $\hat{\theta}_{rt}$ computed by the disturbance torque estimating unit 63 is given to the angle deviation computing unit 61. The angle deviation computing unit 61 computes the deviation $\Delta\theta_r$ between the reactive-force-related composite angle command value $\theta_{rcmd}$ and the steering angle estimation value $\hat{\theta}_{rt}$ (i.e., $\theta_{rcmd} - \hat{\theta}_{rt}$). Note that the angle deviation computing unit 61 may compute the deviation between the reactive-force-related composite angle command value $\theta_{rcmd}$ and the actual steering angle $\theta_{rt}$ computed by the second reduction gear ratio dividing unit 72 ($\theta_{rcmd} - \theta_{rt}$) as the angular deviation $\Delta\theta_r$.

The PD control unit 62 performs PD computation with regard to the angular deviation $\Delta\theta_r$ computed by the angle deviation computing unit 61, thereby computing a basic torque command value $T_{rcmda}$ (basic torque command value as to the second shaft 9). The disturbance torque compensating unit 64 subtracts the disturbance torque estimation value $\hat{T}_{rtd}$ from the basic torque command value $T_{rcmda}$, thereby computing a torque command value $T_{rcmdb}$ (i.e., $T_{rcmda} - \hat{T}_{rtd}$). This yields a disturbance-torque-compensated torque command value $T_{rcmdb}$ (torque command value as to the second shaft 9).

The first reduction gear ratio dividing unit 65 divides the torque command value $T_{rcmdb}$ by the reduction gear ratio $N_r$, thereby computing a motor torque command value $T_{rcmd}$ with regard to the reactive force motor 13. This motor torque command value $T_{rcmd}$ is given to the current command value computing unit 67, and also to the reduction gear ratio multiplying unit 66. The reduction gear ratio multiplying unit 66 multiplies the motor torque command value $T_{rcmd}$ by the reduction gear ratio $N_r$ to convert the motor torque command value $T_{rcmd}$ into the torque command value $N_r \cdot T_{rcmd}$ for the second shaft 9. This torque command value $N_r \cdot T_{rcmd}$ is given to the disturbance torque estimating unit 63.

The current command value computing unit 67 divides the motor torque command value $T_{rcmd}$ computed by the first reduction gear ratio dividing unit 65 by a torque constant $K_r$ of the reactive force motor 13, thereby computing a current command value $I_{rcmd}$. The current deviation computing unit 68 computes the deviation $\Delta I_r$ between the current command value $I_{rcmd}$ obtained by the current command value computing unit 67 and the motor current $I_{rm}$ detected by the current detecting circuit 32 (i.e., $I_{rcmd} - I_{rm}$).

The PID control unit 69 performs PID computation with regard to the current deviation $\Delta I_r$ computed by the current deviation computing unit 68, thereby generating a drive command value for transitioning the motor current $I_{rm}$ flowing to the reactive force motor 13 to the current command value $I_{rcmd}$. The PWM control unit 70 generates PWM control signals of a duty ratio corresponding to the drive command value, which are supplied to the drive circuit 31. Accordingly, electric power corresponding to the drive command value is supplied to the reactive force motor 13.

4.1 Detailed Description of Disturbance Torque Estimating Unit 63

Figure 7A:
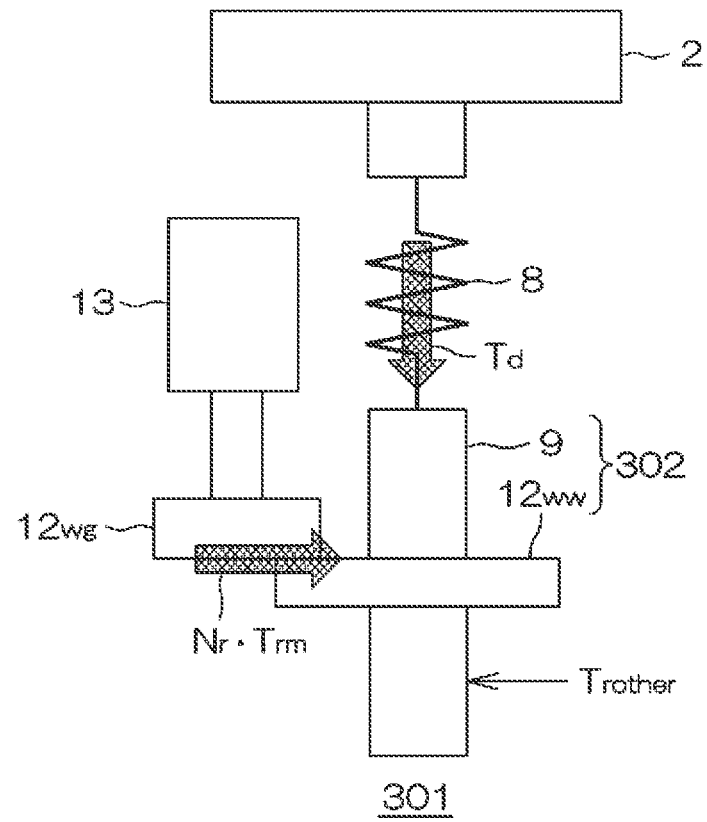
FIG. 7A is a schematic diagram illustrating an example of a physical model of a reactive-force-motor-side mechanism.

The disturbance torque estimating unit 63 is configured of a disturbance observer that estimates disturbance torque $T_{rt}a$, steering angle $\theta_{rt}$, and angular velocity $d\theta_{rt}/dt$, using a physical model 301 of a reactive-force-motor-side mechanism illustrated in FIG. 7A, for example. In FIG. 7A, the worm wheel of the reduction gear 12 in FIG. 1 is denoted by $12_{ww}$, and the worm gear of the reduction gear 12 is denoted by $12_{wg}$.

This physical model 301 includes a first plant 302 including the second shaft 9 and the worm wheel $12_{ww}$ fixed to the second shaft 9. The first plant 302 is given motor torque $N_r \cdot T_{rcom}$ from the reactive force motor 13 and disturbance torque $T_{rtd}$. The disturbance torque $T_{rtd}$ includes the steering torque $T_d$ given to the first plant 302 from the steering wheel 2 via the torsion bar 8, and disturbance torque $T_{rother}$ other than the steering torque $T_d$. The disturbance torque $T_{rother}$ other than the steering torque $T_d$ includes frictional torque due to friction between the worm wheel $12_{ww}$ and the worm gear $12_{wg}$.

The equation of motion for inertia of the physical model 301 is as expressed in the following Expression (3)

$$J_r \ddot{\theta}_{rt} = N_r \cdot T_{rcmd} + T_{rtd}$$

$$T_{rtd} = T_d + T_{rother} \quad (3)$$

where $J_r$ represents the inertia of the first plant 302.

Here, $d^2\theta/dt^2$ is the angular acceleration of the first plant 302. $T_{rtd}$ represents the disturbance torque given to the first plant 302. In this embodiment, the disturbance torque estimating unit 63 estimates the disturbance torque $T_{rtd}$, the steering angle $\theta_{rt}$, and the angular velocity $d\theta_{rt}/dt$, based on the disturbance observer constructed from the equation of motion for inertia of the physical model 301 (extended state observer). This will be described in detail below.

The equation of state for the physical model 301 in FIG. 7A is as expressed in the following Expression (4).

$$\begin{cases} \dot{x} = Ax + B_1 u_1 + B_2 u_2 \\ y = Cx + Du_1 \end{cases} \quad (4)$$

Here, x is a state variable vector, $u_1$ is a known input vector, $u_2$ is an unknown input vector, and y is an output vector (measured value). Also, A is a system matrix, $B_1$ is a first input matrix, $B_2$ is a second input matrix, C is an output matrix, and D is a direct matrix. The above equation of state is extended to a system including the unknown input vector $u_2$ as one state. The equation of state of the extended system (extended equation of state) is expressed by the following Expression (5).

$$\begin{cases} \dot{x}_e = A_e x_e + B_e u_1 \\ y = C_e x_e \end{cases} \quad (5)$$

$A_e$ is a system matrix of the extended system, $B_e$ is a known input matrix of the extended system, and $C_e$ is an output matrix of the extended system. Also, $x_e$ is a state variable vector of the extended system, and is expressed as in the following Expression (6).

$$x_e = \begin{bmatrix} x \\ u_2 \end{bmatrix} \quad (6)$$

From the extended equation of state in the above Expression (5), a disturbance observer expressed by the equation of the following Expression (7) (extended state observer) is constructed.

$$\begin{cases} \dot{\hat{x}}_e = A_e \hat{x}_e + B_e u_1 + L(y - \hat{y}) \\ \hat{y} = C_e \hat{x}_e \end{cases} \quad (7)$$

Here, $\hat{x}_e$ represents an estimation value of $x_e$. L is an observer gain. Also, $\hat{y}$ represents an estimation value of y. Further, $\hat{x}_e$ is as expressed by the following Expression (8).

$$\hat{x}_e = \begin{bmatrix} \hat{\theta}_{rt} \\ \dot{\hat{\theta}}_{rt} \\ \hat{T}_{rtd} \end{bmatrix} \quad (8)$$

Figure 8:
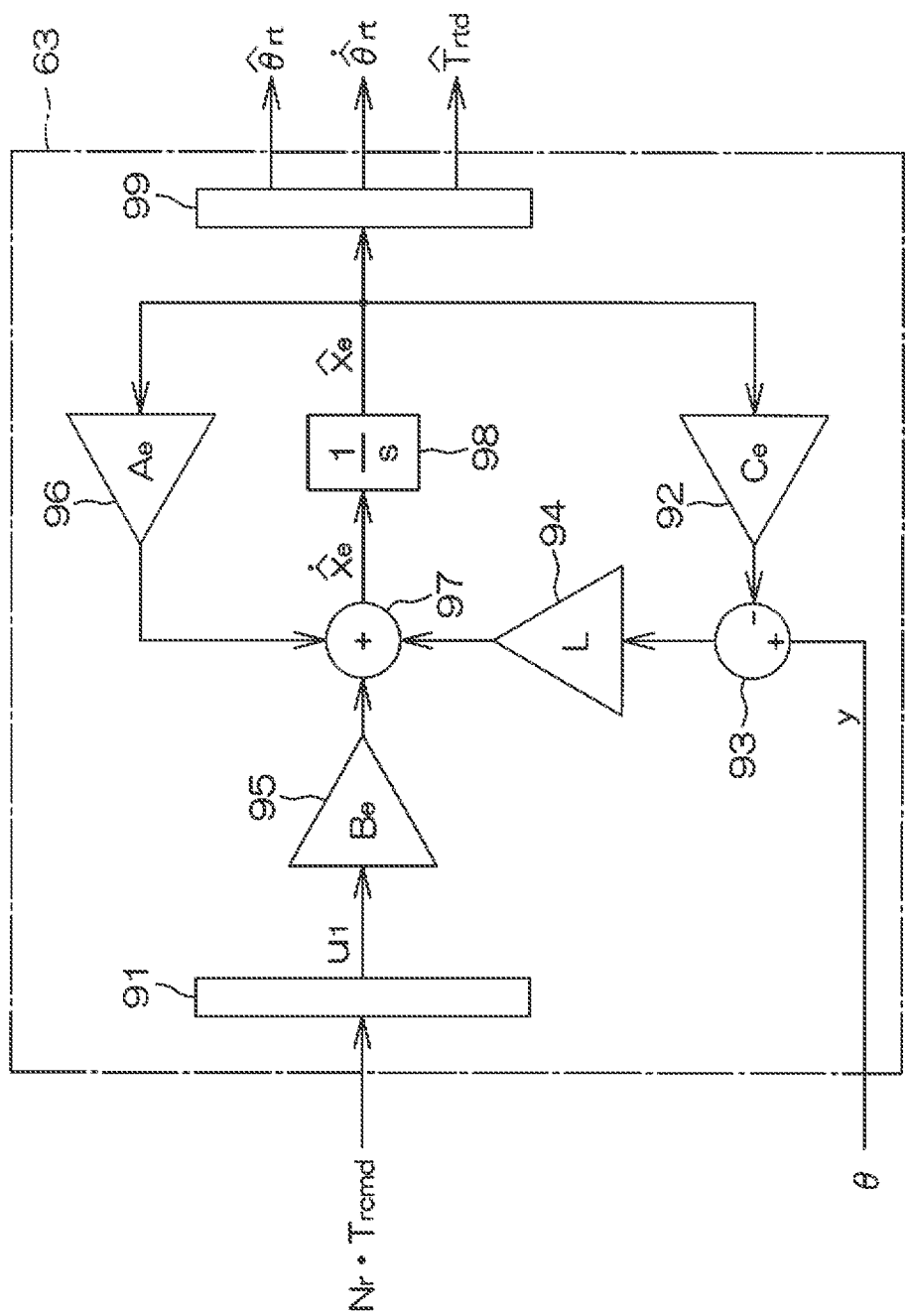
FIG. 8 is a block diagram illustrating a configuration of a disturbance torque estimating unit.

Here, $\hat{\theta}_{rt}$ is an estimation value of $\theta_{rt}$, and $\hat{T}_{rtd}$ is an estimation value of $T_{rtd}$. The disturbance torque estimating unit 63 computes a state variable vector $\hat{x}_e$ based on the equation of Expression (7) above. The disturbance torque estimating unit 63 includes an input vector input unit 91, an output matrix multiplying unit 92, a first adding unit 93, a gain multiplying unit 94, an input matrix multiplying unit 95, a system matrix multiplying unit 96, a second adding unit 97, an integrating unit 98, and a state variable vector output unit 99, as illustrated in FIG. 8.

The torque command value $N_r \cdot T_{rcmd}$ computed by the reduction gear ratio multiplying unit 66 (see FIG. 6) is given to the input vector input unit 91. The input vector input unit 91 outputs an input vector $u_1$. The output of the integrating unit 98 is the state variable vector $\hat{x}_e$ (see Expression (8) above). When starting computation, an initial value is given as the state variable vector $\hat{x}_e$. The initial value of the state variable vector $\hat{x}_e$ is 0, for example.

The system matrix multiplying unit 96 multiples the state variable vector $\hat{x}_e$ by a system matrix $A_e$. The output matrix multiplying unit 92 multiples the state variable vector $\hat{x}_e$ by the output matrix $C_e$. The first adding unit 93 subtracts the output ($C_e \cdot \hat{x}_e$) of the output matrix multiplying unit 92 from the output vector (measured value) y that is the actual steering angle $\theta_{rt}$ computed by the second reduction gear ratio dividing unit 72 (see FIG. 6). That is to say, the first adding unit 93 computes the difference (y−$\hat{y}$) between the output vector y and the output vector estimation value $\hat{y}$ (i.e., $C_e \cdot \hat{x}_e$). The gain multiplying unit 94 multiples the output (y−$\hat{y}$) of the first adding unit 93 by the observer gain L (see Expression (7) above).

The input matrix multiplying unit 95 multiples the input vector $u_1$ output from the input vector input unit 91 by the input matrix $B_e$. The second adding unit 97 adds the output of the input matrix multiplying unit 95 ($B_e \cdot u_1$), the output of the system matrix multiplying unit 96 ($A_e \cdot \hat{x}_e$), and the output of the gain multiplying unit 94 (L(y−$\hat{y}$)), thereby computing a derivative value $d\hat{x}_e/dt$ of the state variable vector. The integrating unit 98 integrates the output ($d\hat{x}_e/dt$) of the second adding unit 97, thereby computing the state variable vector $\hat{x}_e$. The state variable vector output unit 99 computes the disturbance torque estimation value $\hat{T}_{rtd}$, the steering angle estimation value $\hat{\theta}_{rt}$, and angular velocity estimation value $d\hat{\theta}_{rt}/dt$, based on the state variable vector $\hat{x}_e$.

5. Configuration of Steering-Related Angle Control Unit 82

Figure 9:
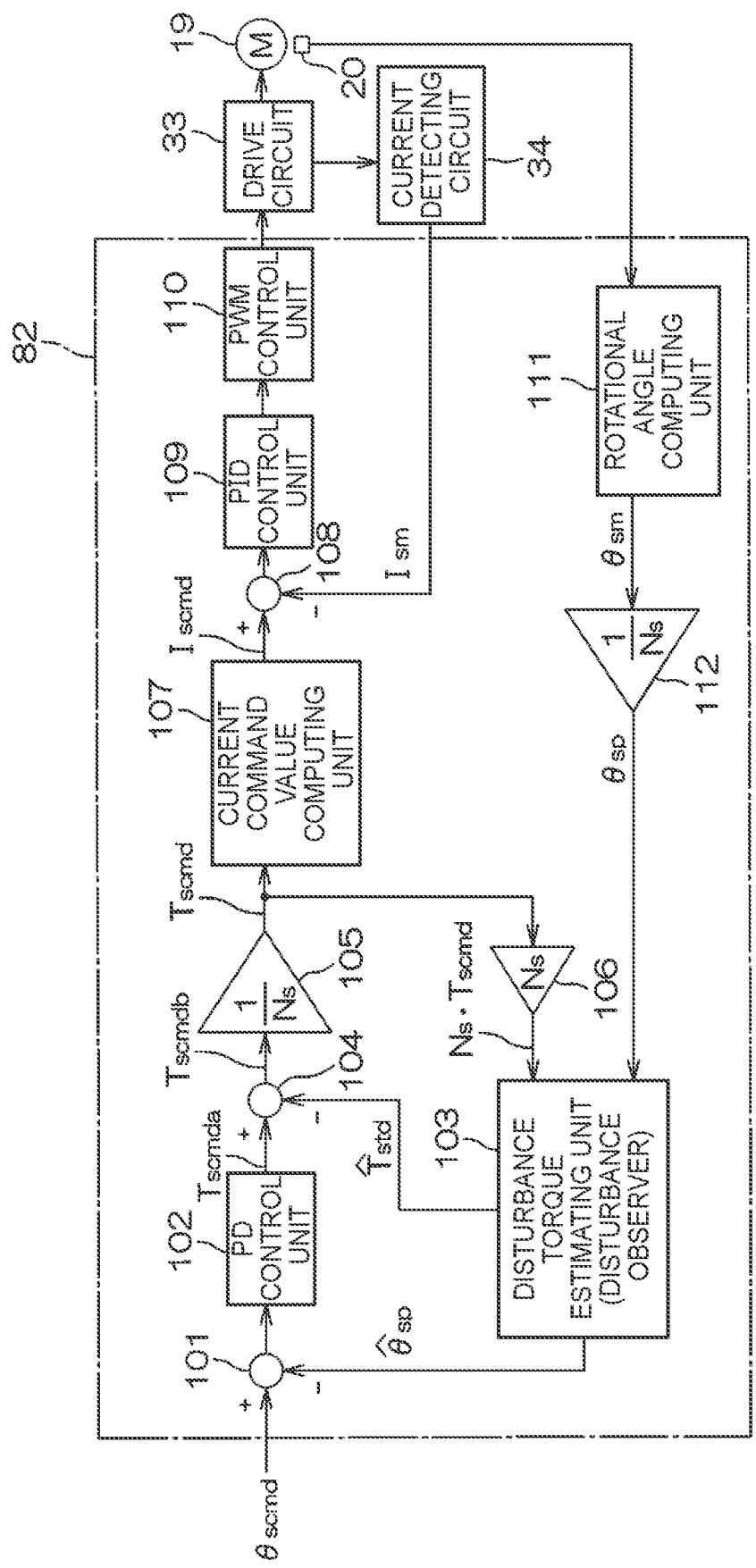
FIG. 9 is a block diagram illustrating a configuration of a steering-related angle control unit.

The steering-related angle control unit 82 controls the drive circuit 33 of the steering motor 19 based on the steering-related composite angle command value $\theta_{scmd}$, and the motor current $I_{sm}$ detected by the current detecting circuit 34 and the output signals of the rotational angle sensor 20, as illustrated in FIG. 9. The steering-related angle control unit 82 includes an angle deviation computing unit 101, a PD control unit 102, a disturbance torque estimating unit 103, a disturbance torque compensating unit 104, a third reduction gear ratio dividing unit 105, a reduction gear ratio multiplying unit 106, a current command value computing unit 107, a current deviation computing unit 108, a PID control unit 109, a PWM control unit 110, a rotational angle computing unit 111, and a fourth reduction gear ratio dividing unit 112.

The rotational angle computing unit 111 computes a rotor rotational angle $\theta_{sm}$ of the steering motor 19 based on output signals of the rotational angle sensor 20. The fourth reduction gear ratio dividing unit 112 converts the rotor rotational angle $\theta_{sm}$ computed by the rotational angle computing unit 111 into the rotational angle (actual steered angle) $\theta_{sp}$ of the pinion shaft 15 by dividing the rotor rotational angle $\theta_{sm}$ by a reduction gear ratio $N_s$ of the reduction gear 18. The disturbance torque estimating unit 103 is provided to estimate nonlinear torque generated as disturbance (disturbance torque, i.e., torque other than steering motor torque) at a control object of the steering motor 19 (hereinafter referred to as "second plant"). The disturbance torque estimating unit 103 estimates disturbance torque (disturbance load) $T_{std}$, steered angle $\theta_{sp}$, and steered angle derivative value (angular velocity) $d\theta_{sp}/dt$, based on a torque command value $N_s \cdot T_{scmd}$ that is an input value of the second plant, and the actual steered angle $\theta_{sp}$ that is output of the second plant. Estimation values of the disturbance torque $T_{std}$, the steered angle $\theta_{sp}$, and the steered angle derivative value $d\theta_{sp}/dt$, will respectively be written as $\hat{T}_{std}$, $\hat{\theta}_{sp}$, and $d\hat{\theta}_{sp}/dt$. Details of the disturbance torque estimating unit 103 will be described later.

The disturbance torque estimation value $\hat{T}_{std}$ computed by the disturbance torque estimating unit 103 is given to the disturbance torque compensating unit 104 as a disturbance torque compensation value. The steered angle estimation value $\hat{\theta}_{sp}$ computed by the disturbance torque estimating unit 103 is given to the angle deviation computing unit 101. The angle deviation computing unit 101 computes the deviation $\Delta\theta_{sp}$ between the steering-related composite angle command value $\theta_{scmd}$ and the steered angle estimation value $\hat{\theta}_p$ (i.e., $\theta_{scmd} - \hat{\theta}_{sp}$). Note that the angle deviation computing unit 101 may compute the deviation between the steering-related composite angle command value $\theta_{scmd}$ and the actual steered angle $\theta_{sp}$ computed by the fourth reduction gear ratio dividing unit 112 ($\theta_{scmd} - \theta_{sp}$) as the angular deviation $\Delta\theta_s$.

The PD control unit 102 performs PD computation with regard to the angular deviation $\Delta\theta_s$ computed by the angle deviation computing unit 101, thereby computing a basic torque command value $T_{scmda}$ (basic torque command value as to the pinion shaft 15). The disturbance torque compensating unit 104 subtracts the disturbance torque estimation value $\hat{T}_{std}$ from the basic torque command value $T_{scmda}$, thereby computing a torque command value $T_{scmdb}$ (i.e., $T_{scmda} - \hat{T}_{std}$). This yields a disturbance-torque-compensated torque command value $T_{rcmdb}$ (torque command value as to the pinion shaft 15).

The third reduction gear ratio dividing unit 105 divides the torque command value $T_{scmdb}$ by the reduction gear ratio $N_s$, thereby computing a motor torque command value $T_{scmd}$ with regard to the steering motor 19. This motor torque command value $T_{scmd}$ is given to the current command value computing unit 107, and also to the reduction gear ratio multiplying unit 106. The reduction gear ratio multiplying unit 106 multiples the motor torque command value $T_{scmd}$ by the reduction gear ratio $N_s$ to convert the motor torque command value $T_{scmd}$ into the torque command value $N_s \cdot T_{scmd}$ for the pinion shaft 15. This torque command value $N_s \cdot T_{scmd}$ is given to the disturbance torque estimating unit 103.

The current command value computing unit 107 divides the motor torque command value $T_{scmd}$ computed by the third reduction gear ratio dividing unit 105 by a torque constant Ks of the steering motor 19, thereby computing a current command value $I_{scmd}$. The current deviation computing unit 108 computes the deviation $\Delta I_s$ between the current command value $I_{scmd}$ obtained by the current command value computing unit 107 and the motor current $I_{sm}$ detected by the current detecting circuit 34 (i.e., $I_{scmd} - I_{sm}$).

The PID control unit 109 performs PID computation with regard to the current deviation $\Delta I_s$ computed by the current deviation computing unit 108, thereby generating a drive command value for transitioning the motor current $I_{sm}$ flowing to the steering motor 19 to the current command value $I_{scmd}$. The PWM control unit 110 generates PWM control signals of a duty ratio corresponding to the drive command value, which are supplied to the drive circuit 33.

Accordingly, electric power corresponding to the drive command value is supplied to the steering motor 19.

5.1 Detailed Description of Disturbance Torque Estimating Unit 103

Figure 7B:
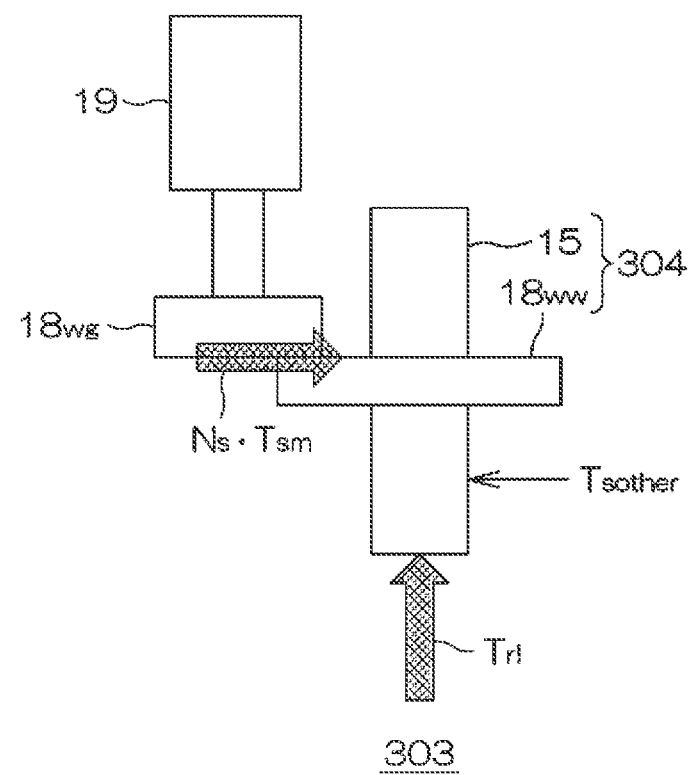
FIG. 7B is a schematic diagram illustrating an example of a physical model of a steering-motor-side mechanism.

The disturbance torque estimating unit 103 is configured of a disturbance observer that estimates disturbance torque $T_{std}$, steered angle $\theta_{sp}$, and angular velocity $d\theta_{sp}/dt$, using a physical model 303 of a steering-motor-side mechanism illustrated in FIG. 7B, for example. In FIG. 7B, the worm wheel of the reduction gear 18 in FIG. 1 is denoted by $18_{ww}$, and the worm gear of the reduction gear 18 is denoted by $18_{wg}$.

This physical model 303 includes a second plant 304 (object of driving by steering motor 19) including the pinion shaft 15 and the worm wheel $18_{ww}$ fixed to the pinion shaft 15. The second plant 304 is given motor torque $N_s \cdot T_{scom}$ from the steering motor 19 and disturbance torque $T_{std}$. The disturbance torque $T_{std}$ includes road surface load torque $T_{rl}$, and disturbance torque $T_{sother}$ other than the road surface load torque $T_{rl}$. The disturbance torque $T_{sother}$ other than the road surface load torque Tri includes frictional torque due to friction between the worm wheel $18_{ww}$ and the worm gear $18_{wg}$.

The equation of motion for inertia of the physical model 303 is as expressed in the following Expression (9)

$$J_s \ddot{\theta}_{so} = N_s \cdot T_{scomd} + T_{std}$$

$$T_{std} = T_{rl} + T_{sother} \qquad (9)$$

where $J_s$ represents the inertia of the second plant 304.

Here, $d^2\theta/dt^2$ is the angular acceleration of the second plant 304. $T_{std}$ represents the disturbance torque given to the second plant 304. The disturbance torque estimating unit 103 estimates the disturbance torque $T_{std}$, the steered angle $\theta_{sp}$, and the angular velocity $d\theta_{sp}/dt$, by a method similar to that of the disturbance torque estimating unit 63 described above, based on the equation of motion in Expression (9). That is to say, the disturbance torque $T_{std}$, the steered angle $\theta_{sp}$ and the angular velocity $d\theta_{sp}/dt$ are estimated by the disturbance torque estimating unit 103 based on an extended state observer constructed from the equation of motion in the Expression (9) (corresponding to Expression (7) above).

6. Description of Operations and Effects of Reactive Force ECU 202 and Steering ECU 203

With reference to FIG. 2, when the hands-on/off determining unit 42 determines that the driver is gripping the steering wheel 2, the automatic steering angle command value $\theta_{ad}$ set by the higher-order ECU 201 is set as the reactive-force-related automatic steering angle command value $\theta_{rf}$ to which the manual steering angle command value $\theta_{md}$ is added, and the reactive-force-related composite angle command value $\theta_{rcmd}$ is computed. The reactive force motor 13 is controlled based on this reactive-force-related composite angle command value $\theta_{rcmd}$. Also, the manual steering angle command value $\theta_{md}$ is added to the automatic steering angle command value $\theta_{ad}$, thereby computing the steering-related composite angle command value $\theta_{scmd}$. The steering motor 19 is controlled based on this steering-related composite angle command value $\theta_{scmd}$.

Accordingly, the intent of the driver can be promptly reflected at the steering motor 19 and the reactive force motor 13 during automatic steering control. Thus, collaborative control in which manual operations can be performed while performing steering control (turning control and reactive force control (steering wheel angle control)) under automatic steering control, without switching between manual steering control and automatic steering control, can be realized. Also, transitioning between manual steering control and automatic steering control can be performed seamlessly, and accordingly, the driver is not presented with an unnatural sensation when performing manual operations.

When determination is made by the hands-on/off determining unit 42 that the driver is not gripping the steering wheel 2, the reactive-force-related composite angle command value computing unit 44 is given zero as the reactive-force-related automatic steering angle command value $\theta_{rf}$. Accordingly, in this case, the steering motor 19 is controlled based on the steering-related composite angle command value $\theta_{scmd}$ that is obtained by adding the manual steering angle command value $\theta_{md}$ to the automatic steering angle command value $\theta_{ad}$, but the reactive force motor 13 is controlled based on the reactive-force-related composite angle command value $\theta_{rcmd}$ that is made up of the manual steering angle command value $\theta_{md}$ alone. In this case, the manual steering angle command value $\theta_{md}$ is approximately zero, so the steering wheel 2 is fixed at a neutral position during automatic steering. Accordingly, a situation can be avoided in which the steering wheel 2 rotates due to automatic steering in a state in which the driver is not gripping the steering wheel 2, resulting in the driver being caught in the steering wheel 2.

Also, in the present embodiment, the basic torque command value $T_{rcmda}$ is computed based on the reactive-force-related composite angle command value $\theta_{rcmd}$, and the basic torque command value $T_{rcmda}$ is corrected in accordance with the disturbance torque estimation value $\hat{T}_{rtd}$ computed by the disturbance torque estimating unit 63, and accordingly the effects of disturbance on the angle control capabilities of the reactive-force-related angle control unit 45 can be suppressed, as illustrated in FIG. 6. Thus, highly precise angle control of the reactive force motor 13 can be realized.

In the same way, the basic torque command value $T_{scmda}$ is computed based on the steering-related composite angle command value $\theta_{scmd}$, and the basic torque command value $T_{scmda}$ is corrected in accordance with the disturbance torque estimation value $\hat{T}_{std}$ computed by the disturbance torque estimating unit 103, and accordingly the effects of disturbance on the angle control capabilities of the steering-related angle control unit 82 can be suppressed, as illustrated in FIG. 9. Thus, highly precise angle control of the steering motor 19 can be realized.

7. Description of Modification of Manual Steering Angle Command Value Setting Unit 41

In the above-described embodiment, the command value setting unit 52 (see FIG. 3) within the manual steering angle command value setting unit 41 computes the rotational angle $\theta_c$ of the lower column based on Expression (2).

However, an arrangement may be made in which the command value setting unit 52 computes the rotational angle $\theta_c$ of the lower column taking into consideration the disturbance torque $\hat{T}_{std}$ estimated by the disturbance torque estimating unit 103 (see FIG. 9) within the steering-related angle control unit 82, as indicated by the long dashed double-short dashed line in FIG. 3. Specifically, the command value setting unit 52 may compute the rotational angle $\theta_c$ of the lower column based on any of the following Expressions (10) through (12).

$$J_c \ddot{\theta}_c = T_d + N_c \cdot T_m + (-k\theta_c - c\dot{\theta}_c) + \hat{T}_{std, HPF} \qquad (10)$$

Here, $\hat{T}_{std,\,HPF}$ represents disturbance torque following the disturbance torque $\hat{T}_{std}$ estimated by the disturbance torque estimating unit 103 being subjected to high-pass filter processing. The command value setting unit 52 substitutes the steering torque $T_d$ detected by the torque sensor 11 into $T_d$ in Expression (10), substitutes the assist torque command value $T_{ac}$ set by the assist torque command value setting unit 51 into $N_c \cdot T_m$, and solves the differential equation of Expression (10), thereby computing the rotational angle $\theta_c$ of the lower column. The command value setting unit 52 then sets the obtained rotational angle $\theta_c$ of the lower column as the manual steering angle command value $\theta_{md}$. The disturbance torque $T_{std}$ primarily includes road surface load torque $T_{rl}$.

$$J_c \ddot{\theta}_c = T_d + N_c \cdot T_m + (-k\theta_c - c\dot{\theta}_c + \alpha \hat{T}_{std}) \quad (11)$$

Here, $\alpha$ is a predetermined coefficient, and $\hat{T}_{std}$ is the disturbance torque $\hat{T}_{std}$ estimated by the disturbance torque estimating unit 103. The command value setting unit 52 computes the rotational angle $\theta_c$ of the lower column by solving the differential equation of Expression (11), and sets the obtained rotational angle $\theta_c$ as the manual steering angle command value $\theta_{md}$.

$$J_c \ddot{\theta}_c = T_d \cdot N_c \cdot T_m + \beta \hat{T}_{std} \quad (12)$$

Here, $\beta$ is a predetermined coefficient, and $\hat{T}_{std}$ is the disturbance torque $\hat{T}_{std}$ estimated by the disturbance torque estimating unit 103. The command value setting unit 52 computes the rotational angle $\theta_c$ of the lower column by solving the differential equation of Expression (12), and sets the obtained rotational angle $\theta_c$ as the manual steering angle command value $\theta_{md}$. When setting the manual steering angle command value $\theta_{md}$ in this way, the driver will be able to feel road surface information, such as irregularities on the road surface and so forth, through the steering wheel 2.

8. Others

Although an embodiment of this disclosure has been described above, this disclosure can be carried out further by other embodiments as well. For example, the same automatic steering angle command value $\theta_{ad}$ is given by the higher-order ECU 201 to the reactive force ECU 202 and the steering ECU 203 in the above-described embodiment. However, an automatic steering angle command value for the reactive force motor 13 and an automatic steering angle command value for the steering motor 19 may be separately set, and given to the respective ECUs 202, 203 by the higher-order ECU 201.

The disturbance torque estimating units 63, 103 are provided to the reactive-force-related angle control unit 45 and the steering-related angle control unit 82 respectively in the above-described embodiment. However, the disturbance torque estimating unit 63 does not have to be provided to the reactive-force-related angle control unit 45. Also, the disturbance torque compensating units 64, 104 are not indispensable configurations for the disclosure. The disturbance torque $\hat{T}_{std}$ estimated by the disturbance torque estimating unit 103 may be used for settings of the manual steering angle command value $\theta_{md}$ alone, without being used for compensation of the disturbance torque.

This disclosure can be applied to a steer-by-wire system, in which a right-left independent steering system, with a right steered wheel and a left steered wheel each being independently steered, is employed. In this case, a steering ECU is provided for each of the right steered wheel and the left steered wheel. This disclosure can also be applied to a steer-by-wire system in which a four-wheel steering system, with the front wheels and the rear wheels being independently steered, for example, is employed. In this case, a steering ECU is provided for the front wheels and another steering ECU is provided for the rear wheels. This disclosure can also be applied to a steer-by-wire system in which a four-wheel independent steering system, with each of the four wheels being independently steered, is employed. In this case, a steering ECU is provided for each wheel.

Various design modifications of the disclosure may be made within the scope of matters set forth in the Claims.

What is claimed is:

1. A steering device, comprising:
   a steering member;
   a steering operation mechanism mechanically separated from the steering member;
   a reactive force motor configured to impart reactive force torque to the steering member;
   a steering motor configured to drive the steering operation mechanism;
   a steering torque sensor configured to detect steering torque imparted to the steering member by a user; and
   an electronic control unit, wherein
   the electronic control unit is configured to set a manual steering angle command value based on the steering torque,
   the electronic control unit is configured to compute a reactive-force-related composite angle command value based on a reactive-force-related automatic steering angle command value and the manual steering angle command value,
   the electronic control unit is configured to compute a steering-related composite angle command value based on a steering-related automatic steering angle command value and the manual steering angle command value,
   the electronic control unit is configured to cause a rotational angle of the reactive force motor to follow the reactive-force-related composite angle command value,
   the electronic control unit is configured to cause a rotational angle of the steering motor to follow the steering-related composite angle command value, and
   the electronic control unit is configured to estimate first disturbance torque, which is torque other than motor torque of the steering motor acting on an object of driving by the steering motor.

2. The steering device according to claim 1, wherein the electronic control unit is configured to compute a command value based on the steering-related composite angle command value, and is configured to compensate the command value by the first disturbance torque.

3. The steering device according to claim 1, wherein
   the electronic control unit is configured to compute a command value based on the reactive-force-related composite angle command value,
   the electronic control unit is configured to estimate second disturbance torque that is not motor torque of the reactive force motor acting on an object of driving by the reactive force motor, and
   the electronic control unit is configured to compensate the command value by the second disturbance torque.

4. The steering device according to claim 1, wherein the electronic control unit is configured to use estimated torque calculated based on the first disturbance torque to generate the manual steering angle command value.

5. The steering device according to claim 1, wherein a direction of the steering torque and a direction the steering motor drives the steering operation mechanism are the same.

6. A steering device, comprising:
- a steering wheel;
- a rack-and-pinion mechanically separated from the steering wheel;
- a reactive force motor configured to impart reactive force torque to the steering wheel;
- a steering motor configured to drive the rack-and-pinion;
- a steering torque sensor configured to detect steering torque imparted to the steering wheel by a user; and
- an electronic control unit configured to
    - set a manual steering angle command value based on the steering torque,
    - compute a reactive-force-related composite angle command value based on a reactive-force-related automatic steering angle command value and the manual steering angle command value,
    - compute a steering-related composite angle command value based on a steering-related automatic steering angle command value and the manual steering angle command value,
    - cause a rotational angle of the reactive force motor to follow the reactive-force-related composite angle command value,
    - cause a rotational angle of the steering motor to follow the steering-related composite angle command value, and
    - estimate first disturbance torque, which is torque other than motor torque of the steering motor acting on an object of driving by the steering motor.

* * * * *

UNITED STATES PATENT AND TRADEMARK OFFICE
CERTIFICATE OF CORRECTION

| | |
|---|---|
| PATENT NO. | : 11,745,792 B2 |
| APPLICATION NO. | : 17/371822 |
| DATED | : September 5, 2023 |
| INVENTOR(S) | : Naoki Shoji et al. |

It is certified that error appears in the above-identified patent and that said Letters Patent is hereby corrected as shown below:

On the Title Page

(72) Delete "Sakura (JP)"; and insert --Sakurai (JP)--

Signed and Sealed this
Ninth Day of January, 2024

Katherine Kelly Vidal
*Director of the United States Patent and Trademark Office*